(12) United States Patent
Kontz et al.

(10) Patent No.: US 9,929,899 B2
(45) Date of Patent: Mar. 27, 2018

(54) SNAPSHOT MESSAGE

(71) Applicant: HEWLETT PACKARD ENTERPRISE DEVELOPMENT LP, Houston, TX (US)

(72) Inventors: Michael Kontz, Fort Collins, CO (US); Derek Alan Sherlock, Boulder, CO (US)

(73) Assignee: Hewlett Packard Enterprises Development LP, Houston, TX (US)

( * ) Notice: Subject to any disclaimer, the term of this patent is extended or adjusted under 35 U.S.C. 154(b) by 53 days.

(21) Appl. No.: 14/911,350

(22) PCT Filed: Sep. 20, 2013

(86) PCT No.: PCT/US2013/060998
§ 371 (c)(1),
(2) Date: Feb. 10, 2016

(87) PCT Pub. No.: WO2015/041686
PCT Pub. Date: Mar. 26, 2015

(65) Prior Publication Data
US 2016/0191303 A1  Jun. 30, 2016

(51) Int. Cl.
*H04L 12/24* (2006.01)
*H04L 12/703* (2013.01)
(Continued)

(52) U.S. Cl.
CPC .......... *H04L 41/0663* (2013.01); *H04L 45/28* (2013.01); *H04L 47/11* (2013.01);
(Continued)

(58) Field of Classification Search
None
See application file for complete search history.

(56) References Cited

U.S. PATENT DOCUMENTS 6,587,995 B1    7/2003  Duboc et al.
7,324,441 B1 *  1/2008  Kloth ............... H04L 47/10
                                              370/229

(Continued)

FOREIGN PATENT DOCUMENTS

EP    1191764         3/2002
EP    1277116         11/2005
TW    201308946 A     2/2013

OTHER PUBLICATIONS

International Searching Authority, The International Search Report and the Written Opinion for PCT/US2013/060998 dated Jun. 19, 2014, 9 Pages.

(Continued)

*Primary Examiner* — Andrew Lai
*Assistant Examiner* — Jamaal Henson
(74) *Attorney, Agent, or Firm* — Hewlett Packard Enterprise Patent Department

(57) ABSTRACT

A blockage is detected at a first link based on a delay and/or stoppage of transmission of a data message along the first link between first and second nodes of a plurality of nodes of a fabric. A snapshot message is sent along at least a second link between the first and second nodes in response to the blockage being detected. The second node may capture a fabric state at the second node in response to receiving the snapshot message, before a corrective action occurs.

21 Claims, 3 Drawing Sheets

(51) Int. Cl.
   *H04L 12/801*   (2013.01)
   *H04L 12/939*   (2013.01)
(52) U.S. Cl.
   CPC .............. *H04L 47/12* (2013.01); *H04L 47/29* (2013.01); *H04L 49/557* (2013.01)

(56) References Cited

U.S. PATENT DOCUMENTS

| | | |
|---|---|---|
| 8,213,294 B2 | 7/2012 | Arndt et al. |
| 2003/0031126 A1* | 2/2003 | Mayweather ......... H04L 12/437 370/223 |
| 2005/0025046 A1* | 2/2005 | Khambatkone ........... H04J 3/14 370/228 |
| 2005/0105482 A1 | 5/2005 | Kobayashi et al. |
| 2005/0108444 A1 | 5/2005 | Flauaus et al. |
| 2006/0285486 A1* | 12/2006 | Roberts ............... H04L 12/5601 370/216 |
| 2009/0063714 A1* | 3/2009 | Dibella ............... G06F 11/0778 710/5 |
| 2009/0141656 A1* | 6/2009 | Fan ................... H04L 29/12009 370/254 |
| 2012/0230671 A1 | 9/2012 | Nakada et al. |
| 2012/0303761 A1 | 11/2012 | Wang et al. |
| 2013/0054852 A1 | 2/2013 | Fuoco et al. |

OTHER PUBLICATIONS

Taktak, et al; "A Tool for Automatic Detection of Deadlock in Wormhole Networks on Chip," < http://www.lsv.ens-cachan.fr/Publis/PAPERS/PDF/TED-todaes07.pdf >, Jan. 2008 (22 pages).

\* cited by examiner

SNAPSHOT MESSAGE

BACKGROUND

Computer systems and networks implement many types of fabric which provide communication between interacting components. It may be somewhat common in complex fabric implementations to encounter blockage issues in post silicon testing like deadlocks and starvation. System architects may be challenged to design more effective networks.

BRIEF DESCRIPTION OF THE DRAWINGS

The following detailed description references the drawings, wherein.

DETAILED DESCRIPTION

Figure 1:
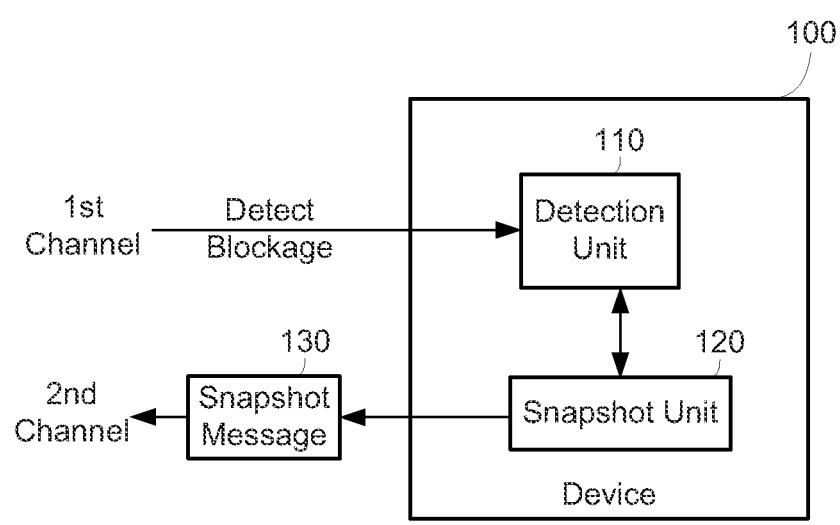
FIG. 1 is an example block diagram of a device to send a snapshot message if blockage is detected.

Specific details are given in the following description to provide a thorough understanding of embodiments. However, it will be understood that embodiments may be practiced without these specific details. For example, systems may be shown in block diagrams in order not to obscure embodiments in unnecessary detail. In ether instances, well-known processes, structures and techniques may be shown without unnecessary detail in order to avoid obscuring embodiments.

Computer systems and networks implement increasingly complex fabric to facilitate fast, reliable communication between interacting components. The fabric can be as small as communication between sub blocks within a chip or as large as communication across multiple computers in different countries. The complexity of many modern fabrics is high due to multiple virtual channels, quality of service features, automatic error handling, etc. This high complexity makes fully modeling and/or simulating life size systems in pre-silicon environments difficult. It may not be uncommon then, to encounter issues in the fabric during the first life size model in post silicon.

One common issue is deadlock where two or more requestors are each waiting for the other to move before proceeding such that neither ever moves. Another common fabric issue is starvation where one or more requestors make progress at the expense of one or more other requestors such that these other requestors never move, or are unnecessarily delayed. Debugging such issues in post silicon may be challenging for several reasons. For instance, there may be limited visibility into a system state, especially inside chips.

Further, many times, issues may not involve just one component, but instead an overall interaction between components, like a circular dependency involving multiple components. Also, hardware and/or software may have error handling, which will unintentionally free the fabric and take it out of the blocked state. A debugger coming in after the fact may then have few or no clues as to a cause of the issues.

Some chips may have programmable debug logic which can be used to trigger on events and capture internal state. However, the debug logic is often limited to a very narrow viewing window and so cannot capture large amounts of internal state in parallel. This also requires special programming that would not be armed usually to look for a fabric issue when one actually occurs for the first time, such as for rarely occurring issues.

For the instances where hardware and/or software error handling interferes with debugging, this handling can be turned off to leave the system in the deadlocked state. However, this still may not resolve issues that only arise long enough to cause a timeout and are eventually resolved or where error handling is part of the stimulus needed to cause the blockage, like during a resend/reroute event.

Examples may provide a mechanism that captures the distributed state of the fabric at the time of the blockage issue. This information may enable timely and efficient debugging of the problem. An example device may include a detection unit and a snapshot unit. The detection unit may detect a blockage at a first link based on a delay and/or stoppage of transmission of a data message along the first link between first and second nodes of a plurality of nodes of a fabric. The snapshot unit may send a snapshot message along at least a second link between the first and second nodes if the blockage is detected. The second node may capture a fabric state at the second node in response to receiving the snapshot message, before a corrective action occurs in response to the detected blockage.

Thus, examples may take a snapshot before any normal system action to the blockage takes place, thereby gathering an accurate and cohesive picture of the blockage event. Post silicon fabric issues may take weeks, months, or even be near impossible to debug without the ability to capture sufficient information about the problem. The snapshot message based fabric state capture may significantly reduce a risk of encountering fabric blockage problems which are lengthy or near it possible to debug in post silicon. Examples may provide an ability to debug across varying sizes of complex networks of interacting components. Further, examples may be implemented at low cost using common design elements already present in most fabric implementations.

Referring now to the drawings, FIG. 1 is an example block diagram of a device 100 to send a snapshot message if blockage is detected. The device 100 may interface with or be included in a node. A node may be any type of device capable of sending, receiving, or forwarding information over a communication channel. Example nodes may include data communication equipment (DCE) such as a modem, gateway, hub, bridge or switch, or data terminal equipment (DTE) such as a digital telephone handset, a printer or a host computer like a router, a workstation or a server. Example nodes may further include wireless LAN access points and datalink layer devices.

In FIG. 1, the device 100 is shown to include a detection unit 110 and a snapshot unit 120. The detection and snapshot units 110 and 120 may include, for example, a hardware device including electronic circuitry for implementing the functionality described below, such as control logic and/or memory. In addition or as an alternative, the detection and snapshot units 110 and 120 may be implemented as a series of instructions encoded on a machine-readable storage medium and executable by a processor.

The detection unit 110 may detect a blockage at a first channel based on a delay and/or stoppage of transmission of a data message (not shown) along the first channel between first and second nodes of a plurality of nodes (not shown) of a fabric (not shown). The snapshot unit 120 may send a snapshot message 130 along at least a second channel between the first and second nodes if the blockage is detected. The snapshot message may be any type of network packet or datagram, which includes information that causes a node to capture its current fabric state, e.g. take a snapshot.

A channel, such as the first or second channels, may be used to convey an information signal, for example a digital bit stream, from one or several senders (or transmitters) to one or several receivers. A channel has a certain capacity for transmitting information, often measured by its bandwidth in Hz or its data rate in bits per second. Communicating data from one location to another requires some form of pathway or medium. These pathways may be called channels. Such pathways may provide a connection between, for example, initiating and terminating nodes of a circuit or network.

A channel may refer to a physical or logical link. A physical link may be a physical transmission medium such as cable (twisted-pair wire, cable, and fiber-optic cable) or broadcast (microwave, satellite, radio, and infrared). A logical link may be an electrical separation over a multiplexed medium such as frequency-division or time-division multiplexing over a radio channel. The term fabric may refer to a network topology where nodes connect with each other via one or more network switches, such as crossbar or fibre channel switches.

The second node may capture a fabric state at the second node in response to receiving the snapshot message 130, before a corrective action occurs in response to the detected blockage. The fabric state and corrective action will be explained in greater detail below with respect to FIG. 2.

Figure 2:
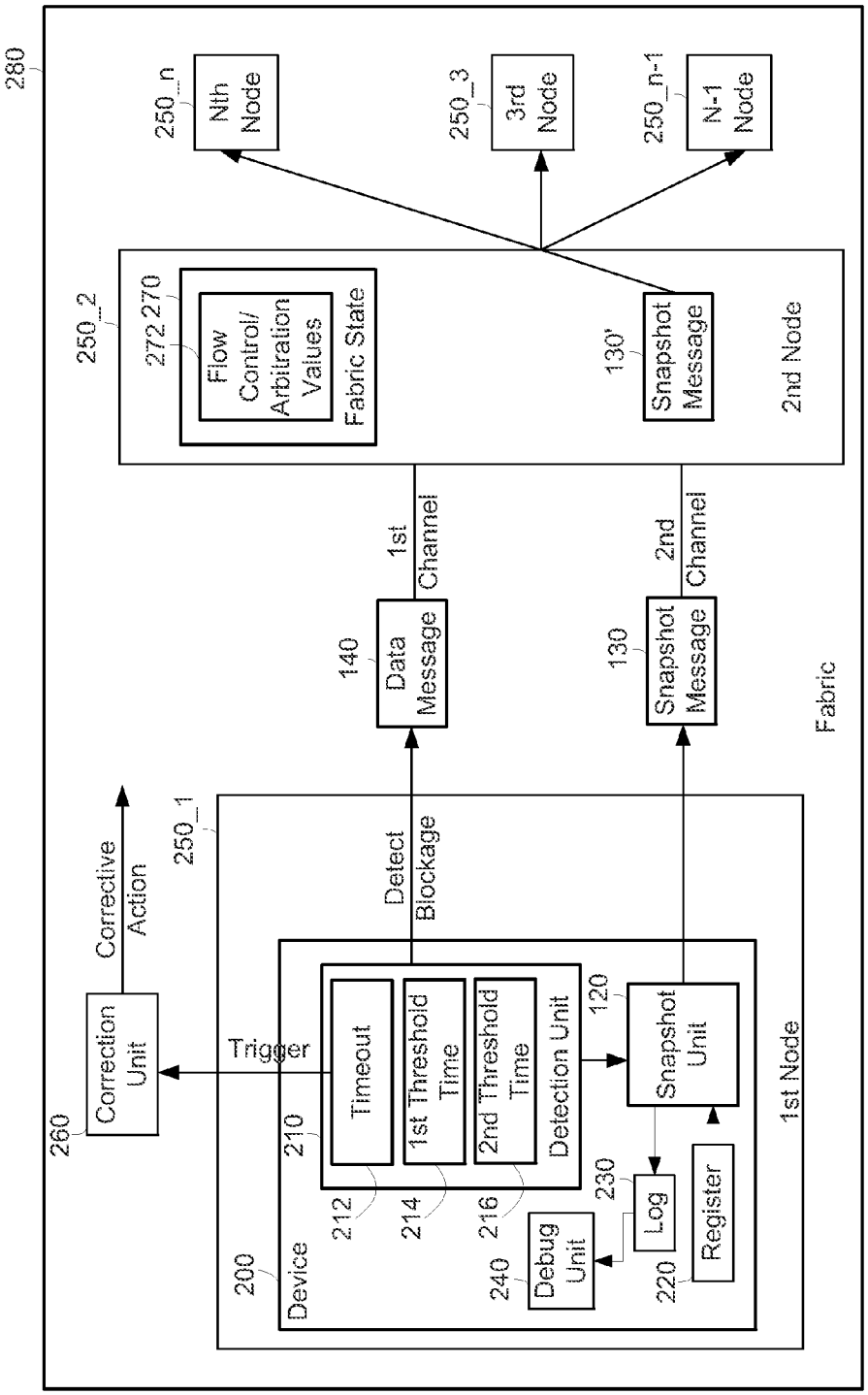
FIG. 2 is an example block diagram of a fabric including a device to send a snapshot message if blockage is detected.

FIG. 2 is an example block diagram of a fabric 280 including a device 200 to send a snapshot message 130 if blockage is detected. The device 200 may interface with or be included in a node. Here, the device 200 is shown to be included in a first node 250_1 of the fabric 280. However, examples of the device 200 may also be external to the first node 250_1. Any hardware or functionality described below with respect to the first node 250_1 or a second node 250_2, may be included in any of the plurality of nodes 250_1 to 250_n, where n is a natural number.

The device 200 of FIG. 2 may include at least the functionality and/or hardware of the device 100 of FIG. 1. For instance, a detection unit 210 included in the device 200 of FIG. 2 may respectively include the functionality of the detection unit 110 of the device 100 of FIG. 1. The device 200 of FIG. 2 also includes the snapshot unit 120, a register 220, a log 230 and a debug unit 240. A correction unit 260 is shown to be included in the fabric 280 but external to the plurality of nodes 250_1 to 250_n. However, examples of the correction unit 260 may also be included in any of the plurality of nodes 250_1 to 250_n The debug and correction units 240 and 260 may include, for example, a hardware device including electronic circuitry for implementing the functionality described below, such as control logic and/or memory. In addition or as an alternative, the debug and correction units 240 and 260 may be implemented as a series of instructions encoded on a machine-readable storage medium and executable by a processor. The register 220 and log 230 may be part of or included in any electronic, magnetic, optical, or other physical storage device.

As explained above, the fabric 280 can span anywhere from sub-blocks of a device, such as a CPU and I/O or memory device, to links of network. Here, the first and second channels are shown to connect the first and second nodes 250_1 and 250_2. The second channel may be a virtual or physical path that is redundant to and separate from the first channel. For example, fabric protocols have multiple channels and/or carry out sideband communication. Example sideband buses may include a register access bus, debug bus, and the like.

The detection unit 210 may detect the blockage at a channel, such as the first or second channels, based on at least one of a node endpoint and flow control timeout 212. The term flow control may relate to a process of managing the rate of data transmission between two nodes to prevent a fast sender from overwhelming a slow receiver. For example, the detection unit 210 may indicate the blockage to the snapshot unit 120 if the at least one of node endpoint and flow control timeout exceeds a first threshold time 214. The first threshold time 214 may be based on a network parameter, such as a POP connection or HTTP connection protocol. Example first threshold times 214 may include any timescale depending on a property of the fabric 280 and/or a desired implementation, such as from microseconds to minutes.

As noted above, if the detection unit 210 detects the blockage at the first channel, the snapshot unit 120 may send the snapshot message 130 to the second node 250_2. The second node 250_2 may capture the fabric state 270 at the second node 250_2 in response to receiving the snapshot message 130. Moreover, the second node 250_2 may forward the snapshot message 130 to a third node 250_3 of the plurality of nodes 250_1 to 250_n. The third node 250_3 may capture a fabric state 270 at the third node 250_3 in response to receiving the snapshot message 130. Further, the second node 250_2 may also forward the snapshot message 130 to the other nodes 250.

Thus, the snapshot unit 120 may broadcast the snapshot message 130 via the second channel to the plurality of nodes 250_1 to 250_n. In turn, the plurality of nodes 250_1 to 250_n may capture the fabric state 270 at the plurality of nodes 250_1 to 250_n in response to receiving the snapshot message 130. While the snapshot unit 120 is not shown to send the snapshot message 130 to the first node 250_1 itself, the snapshot unit 120 may still cause the first node 250_1 to capture its fabric state (not shown).

For example, the second node 250_2 may capture flow control and/or arbitration values 272 for at least one of entry and exit points of the second node 250_2, when the second node 250_2 captures the fabric state 270. The flow control and/or arbitration values 272 may include information related to credits, queue depth, starvation, backpressure, and any other information about the fabric 280.

Credits may relate to information that one node 250 provides to another node 250, to convey how much data can be accepted. Queue depth may relate to a number of pending messages waiting to be input to the node 250 or output from the node 250. Starvation may relate to a process where a queue or channel is continuously denied access or resources. For example, a scheduling algorithm of the second node 250_2 may never switch over from the second channel and thus perpetually block messages at the first channel. Backpressure may relate to sending back messages when queue backlog builds up until a queue is full. This practice may occur iteratively to successive nodes 250 in a path.

All of the plurality of nodes 250_1 to 250_n may at least receive the snapshot message 130 before any corrective action or any system recovery mechanism occurs. This is because the detection unit 210 may trigger the corrective action at a second threshold time 216 after the first threshold time 214. The second threshold time 216 may be determined, for example, experimentally or according to a specification, to lapse after the snapshot message 130 has propagated to all of the plurality of nodes 250_1 to 250_n. For example, the device 200 may begin to count time after the snapshot message 130 is sent and then initiate a trigger after the counted time equals or exceeds the second threshold time 216. Thus, The second threshold time 216 may be greater than or equal to a time for the snapshot message 130 to propagate to the plurality of nodes 250_1 to 250_n.

The correction unit 260 may take the corrective action in response to the trigger by the detection unit 210. The corrective action may include containment, failover and the like. Containment may relate to discarding of any blocked packets, such as any data messages 140 being blocked on the first channel. The term failover may refer to a switching to a redundant or standby computer server, system, hardware component or network upon the failure or abnormal termination of the previously active application, server, system, hardware component or network. For example, the corrective action may be to failover from the first link to the second link.

Each of the plurality of nodes 250_1 to 250_n may capture the fabric state 270 by reading values from one or more of the registers 220, such as status or state registers, internal to each of the plurality of nodes 250_1 to 250_n and writing the values at these registers 220 to the logs 230 that are separate from the registers 220. This is because a value of the registers 220 may change after the corrective action occurs. Thus, the logs 230 may preserve the fabric state at an actual time of the blockage. The debug unit 240 may debug a cause of the blockage based on these logs 230. For example, an administrator or debugger may analyze the logs 230 at a later time to piece together which nodes 250 and/or channels were involved in the blockage, such as by seeing a pattern in a bigger picture of the fabric 280 or a chain of causation. Sometimes, such issues may only be resolved by knowing the fabric state 270 at one or more nodes 250 after the blockage, but before the corrective action, such as for circular dependencies.

Figure 3:
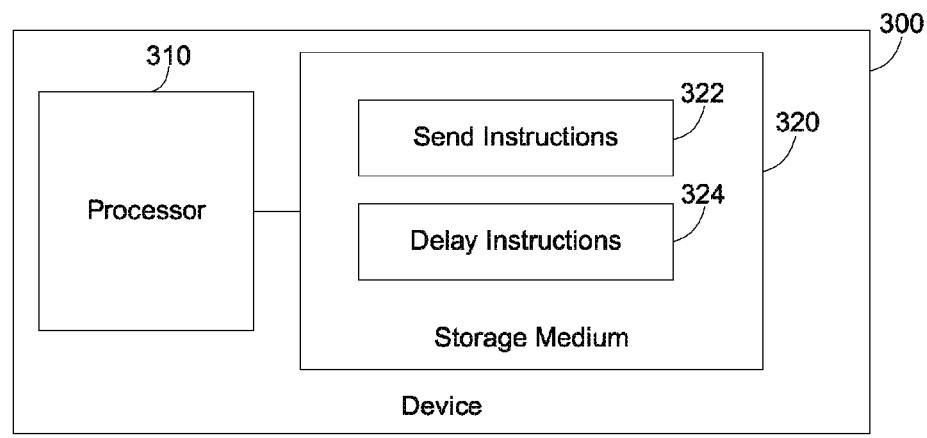
FIG. 3 is an example block diagram of a computing device including instructions for sending a snapshot message if blockage is detected.

FIG. 3 is an example block diagram of a computing device 300 including instructions for sending a snapshot message if blockage is detected. In the embodiment of FIG. 3, the computing device 300 includes a processor 310 and a machine-readable storage medium 320. The machine-readable storage medium 320 further includes instructions 322 and 324 for sending a snapshot message (not shown) if blockage is detected.

The computing device 300 may be, for example, a secure microprocessor, a notebook computer, a desktop computer, an all-in-one system, a server, a network device, a controller, a wireless device, or any other type of device capable of executing the instructions 322 and 324. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322 and 324 to implement sending the snapshot message if blockage is detected. As an alternative or in addition to retrieving and executing instructions, the processor 310 may include at least one integrated circuit (IC), other control logic, other electronic circuits, or combinations thereof that include a number of electronic components for performing the functionality of instructions 322 and 324.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for sending the snapshot message if blockage is detected.

Figure 4:
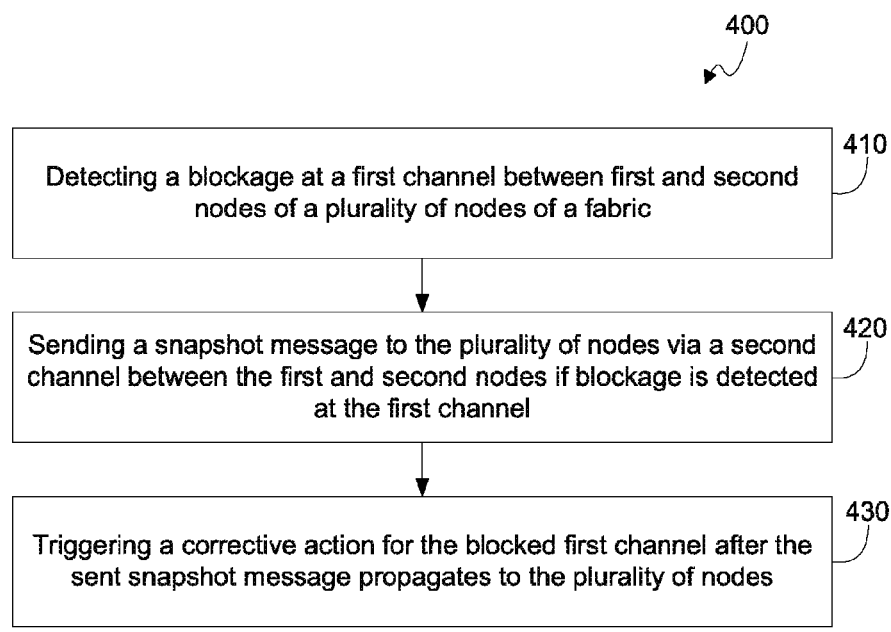
FIG. 4 is an example flowchart of a method for sending a snapshot message if blockage is detected.

Moreover, the instructions 322 and 324 when executed by a processor (e.g., via one processing element or multiple processing elements of the processor) can cause the processor to perform processes, such as, the process of FIG. 4. For example, the send instructions 322 may be executed by the processor 310 to send a snapshot message to a plurality of nodes (not shown) via a second channel (not shown) between the first and second nodes of the plurality of nodes, if blockage is detected at a first channel (not shown) between the first and second nodes.

The delay instructions 324 may be executed by the processor 310 to delay a corrective action for the first channel until the snapshot message reaches the plurality of nodes. The plurality of nodes may capture the fabric state in response to receiving the snapshot message. For instance, the plurality of nodes may capture flow control and/or arbitration values when capturing the fabric state. The captured fabric state may be stored in a log to be read out for debugging.

FIG. 4 is an example flowchart of a method 400 for sending a snapshot message if blockage is detected. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 detects a blockage at a first channel between first and second nodes 250_1 and 250_2 of a plurality of nodes 250_1 to 250_n of a fabric 280. The detecting the blockage at block 410 may include detecting a node endpoint and/or flow control timeout 212.

Then, at block 420, the device 200 sends a snapshot message 130 to the plurality of nodes 250_1 to 250_n via a second channel between the first and second nodes 250_1 and 250_2 if blockage is detected at the first channel. The plurality of nodes 250_1 to 250_n may capture a fabric state 270 in response to receiving the snapshot message 130. The fabric state 270 may include flow control and/or arbitration values 272.

Lastly, at block 430, the device 200 triggers a corrective action for the blocked first channel after the sent snapshot message 130 propagates to the plurality of nodes 250_1 to 250_n. The plurality of nodes 250_1 to 250_n may capture data from one or more registers 220 internal to each of the plurality of nodes 250_1 to 250_n when capturing the fabric state 270. The data of the one or more registers 220 may change after the corrective action is triggered.

We claim:

1. A device, comprising:
   a processor; and
   a non-transitory storage medium storing instructions executable on the processor to:
      detect a blockage at a first link based on at least one of a delay and stoppage of transmission of a data message along the first link between first and second nodes of a plurality of nodes of a fabric;
      broadcast a snapshot message to the plurality of nodes along at least a second link between the first and second nodes in response to the blockage being detected, the snapshot message to cause the plurality of nodes to capture fabric states at the plurality of nodes in response to receiving the snapshot message, and before a corrective action occurs; and
      debug a cause of the blockage based on the captured fabric states; and
      trigger the corrective action at a threshold time from a time associated with the detecting of the blockage, the threshold time greater than or equal to a time for the snapshot message to propagate to the plurality of nodes.

2. The device of claim 1, wherein each fabric state of the fabric states comprises at least one of flow control and arbitration values for at least one of entry and exit points of a respective node of the plurality of nodes.

3. The device of claim 2, wherein the at least one of flow control and arbitration values includes information related to at least one of credits, queue depth, starvation, and backpressure.

4. The device of claim 1, wherein the broadcasting of the snapshot message comprises:
   the second node forwarding the snapshot message to a third node of the plurality of nodes before the corrective action is taken.

5. The device of claim 1, wherein the threshold time is a first threshold time, and wherein the detecting of the blockage is based on at least one of a node endpoint and flow control timeout exceeding a second threshold time.

6. The device of claim 5, wherein the triggering of the corrective action occurs at the first threshold time after the second threshold time.

7. The device of claim 6, wherein the instructions are executable on the processor to
   take the corrective action in response to the triggering, and wherein the corrective action includes at least one of containment and failover.

8. The device of claim 1,
   wherein the debugging comprises reading values from logs to which information of the fabric states are written.

9. The device of claim 1, wherein,
   the second link is at least one a virtual channel and a sideband bus,
   the second link provides a path redundant to the first link, and
   the fabric includes a path between components of at least one of the device and a network.

10. The device of claim 1, wherein the captured fabric states comprise information about at least one selected from among queue depth, starvation, and backpressure.

11. A method, comprising:
   detecting a blockage at a first link between first and second nodes of a plurality of nodes of a fabric;
   broadcasting a snapshot message to the plurality of nodes via a second link between the first and second nodes, the snapshot message to cause the plurality of nodes to capture respective fabric states of the fabric in response to receiving the snapshot message;
   debugging a cause of the blockage based on the captured fabric states; and
   triggering a corrective action for the blocked first link at a threshold time from a time associated with the detecting of the blockage, the threshold time greater than or equal to a time for the snapshot message to propagate to the plurality of nodes.

12. The method of claim 11, wherein the detecting of the blockage includes detecting at least one of a node endpoint and flow control timeout, and wherein information of the fabric states includes at least one of flow control and arbitration values.

13. The method of claim 12, wherein:
   the plurality of nodes capture the fabric states by capturing data from one or more registers internal to each of the plurality of nodes, and
   the data of the one or more registers changes after the corrective action is triggered.

14. The method of claim 11, wherein each of the captured fabric states comprises information about a queue depth relating to a number of pending messages awaiting input or output at a respective node of the plurality of nodes.

15. The method of claim 11, wherein each of the captured fabric states comprises information about starvation and backpressure at a respective node of the plurality of nodes.

16. A non-transitory computer-readable storage medium storing instructions that, if executed by a processor of a device, cause the processor to:
   broadcast a snapshot message to a plurality of nodes via a second link between first and second nodes of the plurality of nodes, if blockage is detected at a first link between the first and second nodes; and
   delay a corrective action for the first link until the snapshot message reaches the plurality of nodes, wherein the plurality of nodes are to capture a fabric state in response to receiving the snapshot message.

17. The non-transitory computer-readable storage medium of claim 16, wherein,
   the plurality of nodes are to capture at least one of flow control and arbitration values when capturing the fabric state, and
   the captured fabric state is stored in a log to be read out for debugging.

18. The non-transitory computer-readable storage medium of claim 16, wherein the instructions if executed cause the processor to:
   debug a cause of the blockage based on the captured fabric state.

19. The non-transitory computer-readable storage medium of claim 16, wherein the instructions if executed cause the processor to:
   trigger the corrective action at a threshold time after a time associated with the detecting of the blockage, the threshold time greater than or equal to a time for the snapshot message to propagate to the plurality of nodes.

20. The non-transitory computer-readable storage medium of claim 16, wherein the captured fabric state comprises information about a queue depth relating to a number of pending messages awaiting input or output at each respective node of the plurality of nodes.

21. The non-transitory computer-readable storage medium of claim 16, wherein the captured fabric state comprises information about starvation and backpressure at each respective node of the plurality of nodes.

* * * * *